United States Patent Office 3,734,692
Patented May 22, 1973

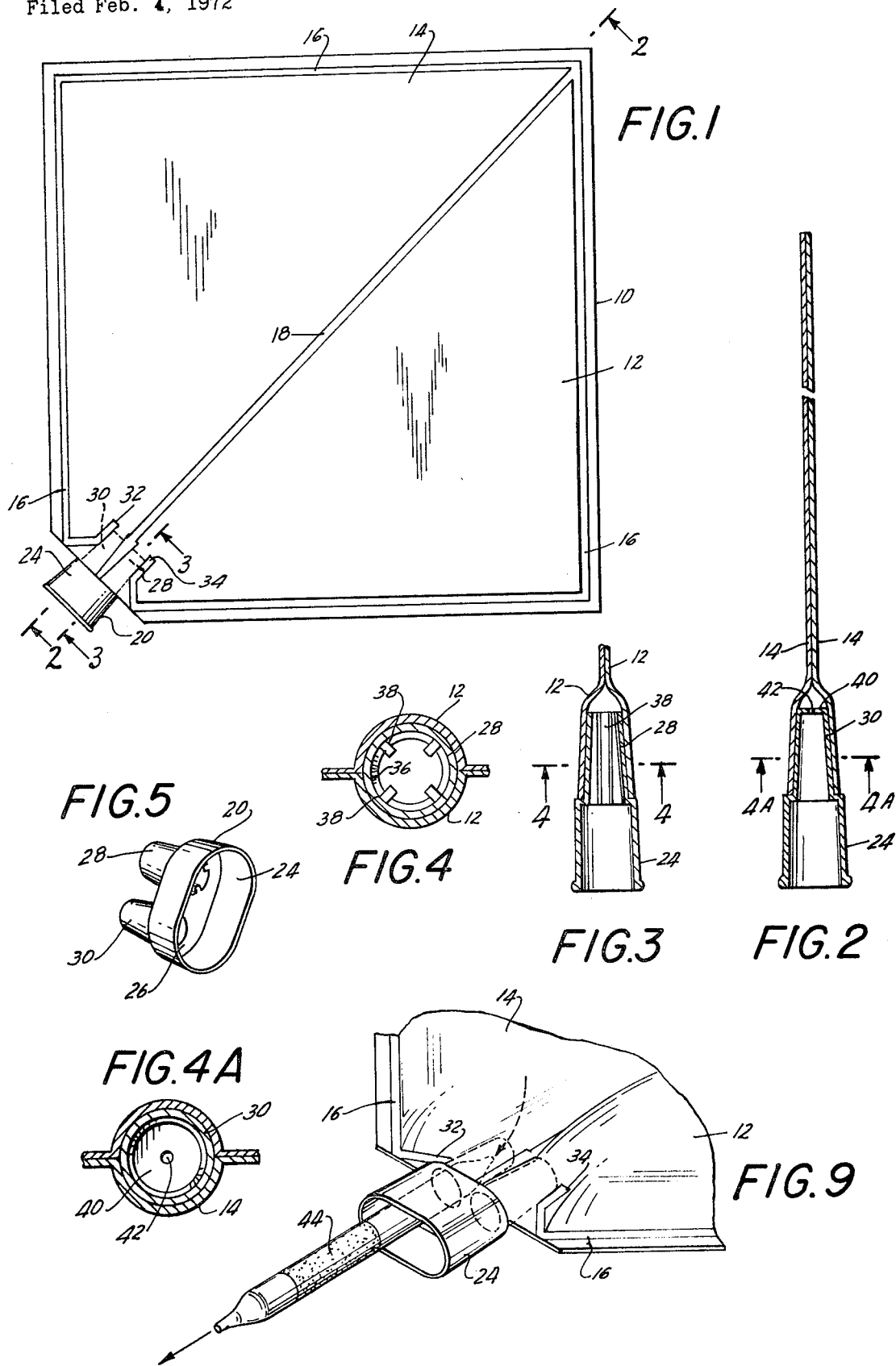

3,734,692
ALVEOLAR AIR BREATH SAMPLING AND
ANALYZING APPARATUS
Jerome R. Lucker, Tenafly, and Andrew A. Oakes and
Thomas H. Foster, Jr., Harrington Park, N.J., assignors
to Becton Dickinson and Company, East Rutherford,
N.J.
Filed Feb. 4, 1972, Ser. No. 223,670
Int. Cl. G01n 1/22, 33/16
U.S. Cl. 23—254 R                                  4 Claims

ABSTRACT OF THE DISCLOSURE

An apparatus for sampling alveolar breath by the sequential collection of a single exhalation includes an inelastic bag having first and second inflatable compartments therein. A mouthpiece is connected to the bag. The mouthpiece has an entrance conduit and a first outlet in communication with the first compartment and a second outlet in communication with the second compartment. The second outlet is adapted to retard the passage of air therethrough until a subject fills the first compartment. The sample of air collected in the second compartment is analyzed by forcing it through an ampoule filled with an alcohol colorimetric reagent.

BACKGROUND OF THE INVENTION

The invention is directed to an apparaturs for use in analyzing alveolar breath and, in particular, to an apparatus adapted to segregate alveolar air from initially expired air.

In order to analyze breath for evaluating both physical functions and determining a physiological condition, it is necessary to obtain for analysis alveolar air from the tested subject. During exhalation, the first portion of the breath exhaled originates in the mouth, windpipe and large lung passages. This first portion must be separated from the later portion which is exhaled from the alveoli.

Recently, law enforcement agencies have expressed the need for apparatus adapted for field testing breath for alcohol content. For such field test results to be introduced, as evidence in a court of law, such apparatus must accurately and reliably sample alveolar air. Further, owing to the difficulty and expense for sterilizing the apparatus for re-use, it is necessary that the entire apparatus be disposable so that it may be discarded after use.

Prior art breath sampling apparatus are subject to various defects. In U.S. Pat. No. 3,544,273, issued to McConnaughey, an apparatus for sampling aveolar air is disclosed employing a pair of inflatable bags connected by a T-shaped valve system wherein one conduit of the valve system contains a pressure loaded one-way valve. A rubber tube connects the one-way valve to an inflatable bag. After exhalation, the rubber tube to the bag is pinched off, the tube is disconnected from the valve, and an ampoule containing an alcohol indicator reagent is inserted into the rubber tube for testing purposes.

The apparatus has several major defects. The pressure loaded valve employed is expensive, difficult to fabricate and is otherwise impractical for mass production techniques. Further, the use of two unconnected inflatable bags makes the apparatus difficult to employ during field testing. Additionally, it is necessary to disconnect the connections to one of the bags before field testing the contents of the bag. This procedure can be cumbersome, particularly in cold weather or under extenuating circumstances.

U.S. Pat. No. 3,437,449, issued to Luckey discloses a breath alcohol kit employing a T-shaped conduit with a mouthpiece, wherein one end of the conduit is connected to a non-elastic inflatable bag and the other end of the conduit is connected to an elastic balloon. The elastic balloon has a flutter valve spaced within the balloon for preventing air from leaving the balloon once inflated. The other end of the balloon communicates with an alcohol indication apparatus.

The Luckey device is subject to the same defects as the McConnaughey device. Additionally, Luckey employs an elastic balloon which is subject to puncture. Further, the alcohol detection apparatus is awkward to employ in field use.

SUMMARY OF THE INVENTION

It is, therefore a primary object of the invention to provide a simple, inexpensive apparatus for collecting alveolar air.

It is another object of the invention to provide a device having means for analyzing the collected alveolar air.

It is another object to provide a device for collecting and testing the breath for alcohol content that is small, inexpensive, simple to operate, reliable and accurate for use in the field.

It is an additional object of the invention to provide a device for collecting and testing alveolar air without detaching any internal conduits in the system. Other objects and advantages will become apparent from the following description.

The above and other objects are met in an apparatus for sampling alveolar breath by the sequential collection of a single exhalation including an inelastic breath bag having first and second inflatable compartments and a mouthpiece connected to said bag. The mouthpiece has an entrance conduit and a first outlet in communication with the first compartment and a second outlet in communication with the second compartment. The second outlet is adapted to retard the passage of air therethrough until the first compartment is inflated. For this purpose, the second outlet can employ an exit orifice which is of substantially lesser diameter than the exit orifice of the first outlet.

The segregated sample of alveolar air collected in the second compartment is analyzed by inserting an ampoule containing colorimetric material in the second outlet and thereafter discharging the air in the second compartment through the ampoule.

By the use of the bipartitioned bag, the defects of the prior art double-bag breath analyzers is obviated. Further, since all conduits are fixedly connected to the single partitioned bag, there is no need to remove any conduit in order to analyze the alveolar air sample.

BRIEF DESCRIPTION OF THE DRAWINGS

A somewhat preferred embodiment of the invention is illustrated in the accompanying drawings, in which:

FIG. 1 is a top view of an apparatus for collecting alveolar air embodying the present invention;

FIG. 2 is a cross-sectional view of the apparatus taken along line 2—2 of FIG. 1;

FIG. 3 is a cross-sectional view of the apparatus mouthpiece taken along line 3—3 of FIG. 1;

FIG. 4 is a cross-sectional view of the first outlet of the mouth piece taken along line 4—4 of FIG. 3;

FIG. 4A is a cross-sectional view of the second outlet of the mouthpiece taken along line 4A—4A of FIG. 2;

FIG. 5 is an enlarged perspective view of a mouthpiece for the breath sampling apparatus;

FIG. 9 is an enlarged perspective view, partially broken away, of the apparatus containing a testing ampoule spaced in an outlet for the compartment containing alveolar air and illustrating the passage of air therethrough.

DESCRIPTION OF PREFERRED EMBODIMENTS

Figure 6:
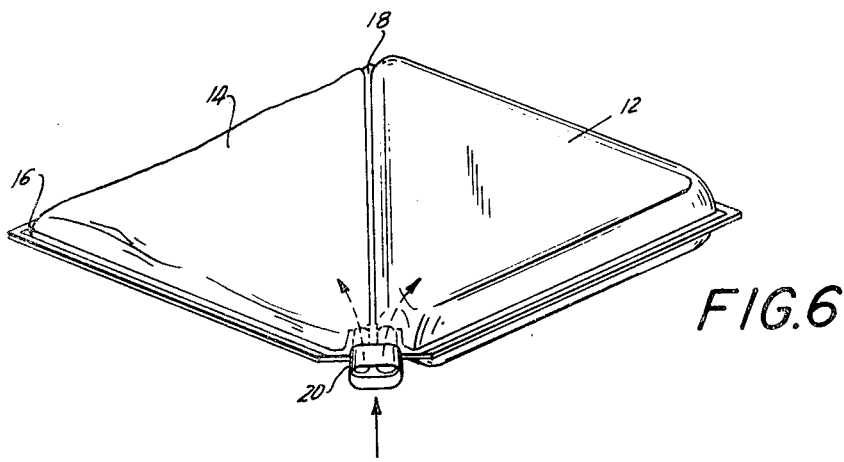
FIG. 6 is an elevational view of the apparatus illustrating the inflation of each compartment.

Referring now to the drawings and particularly, to FIG. 1, the apparatus includes an inelastic breath bag 10. The breath bag may be of any convenient geometrical shape and, is preferably rectilinear and, most preferably, square. Bag 10 is conveniently formed by heat sealing or adhesively sealing a pair of vinyl envelopes formed from vinyl polymers, such as polyethylene or polyvinyl chloride. As illustrated in FIG. 1, the envelopes are preferably heat-sealed along a thin strip 16 adjacent their edges.

In order to compartmentalize the bag, the envelopes are heat-sealed or adhesively sealed along a diagonal 18, thereby forming triangular compartments 12 and 14. One end of the heat-sealed diagonal strip 18 merges with the heat-sealed strip 16 at a corner of the bag.

As illustrated in FIGS. 1 and 5, a mouthpiece 20 is provided in order to permit collection of exhaled air within the compartments of the bag. Tip 24 of the mouthpiece is formed from an oval ribbon of rigid plastic material and an integral flat base 26. Extending downwardly from base 26 are a pair of tapered cylindrical, hollow conduits 28 and 30.

As particularly illustrated in FIGS. 1–3 and 9, conduit 28 extends into compartment 12 and conduit 30 extends into compartment 14. In order to fixedly mount mouthpiece 20 to bag 10, conduits 28 and 30 are heat-sealed or adhesively sealed to the envelopes forming compartments 12 and 14, respectively. As illustrated in FIGS. 1 and 9, in order to accommodate mouthpiece tip 24, it is preferable to diagonally sever the edges of the envelope which would normally abut the mouthpiece tip.

In order to preserve the integrity of each of the inflatable compartments, the thin sealed edges 16 of the envelopes are terminated in a pair of parallel segments 32, 34, each segment being spaced adjacent the outer external edge of the respective mouthpiece outlets 28, 30. Diagonal seal 18 extends, at its other end, into the space between the inlet conduits 28 and 30. By these provisions compartments 12 and 14 are rendered totally sealed and enclosed with the exception of the twin air mouthpiece inlets.

As illustrated in FIGS. 3 and 4 compartment inlet conduit 28 has a generally tapering internal bore 36. The bore is of sufficient diameter so as to permit compartment 12 to be rapidly filled as air is expired into the tip 24 of the mouthpiece. A series of axially aligned and radially directed supporting ribs 38 are spaced within the internal bore of conduit 28.

As shown in FIGS. 2 and 4A, inlet conduit 30 has an inwardly tapering hollow bore which terminates in circular disc 40. A centrally spaced exit orifice 42 provides communication between compartment 14 and mouthpiece 20. Orifice 42 of inlet conduit 30 is of substantially lesser diameter than orifice bore 36 of inlet 28. For most purposes it is preferred that the diameter of the exit orifice of outlet conduit 28 is from about 3/16 to 5/16 inch and the diameter or orifice 42 of conduit 30 is from about 1/32 to 3/32 inch. To further insure reliable separation and segregation of alveolar air and to permit easy use of the apparatus by the subject it is further preferred that the ratio of the diameter of the exit orifice bore of conduit 28 to exit orifice 42 of conduit 30 be from about 10:1 to 2:1.

In operation, the test subject exhales through mouthpiece 24 into bag 10 with one long expired breath. Generally, the air temperature should be above about 60° F. for the test. Owing to the increased air pressure in the bore of conduit 30 owing to the narrow opening of exit orifice 42, compartment 12 initially fills with air through conduit 28. When compartment 12 is full, continued exhalation pressure forces air through orifice 42 fills compartment 14. In the event that compartment 14 is not filled with one exhalation, the apparatus is removed from the subject's mouth and compartment 12 is collapsed to discharge the air in it outwardly through the mouthpiece. The subject then exhales again into the device, repeating the sampling procedure in which the first portion of the exhalation goes into compartment 12 and the last, or alveolar, portion goes into compartment 14 for analysis.

Figure 7:
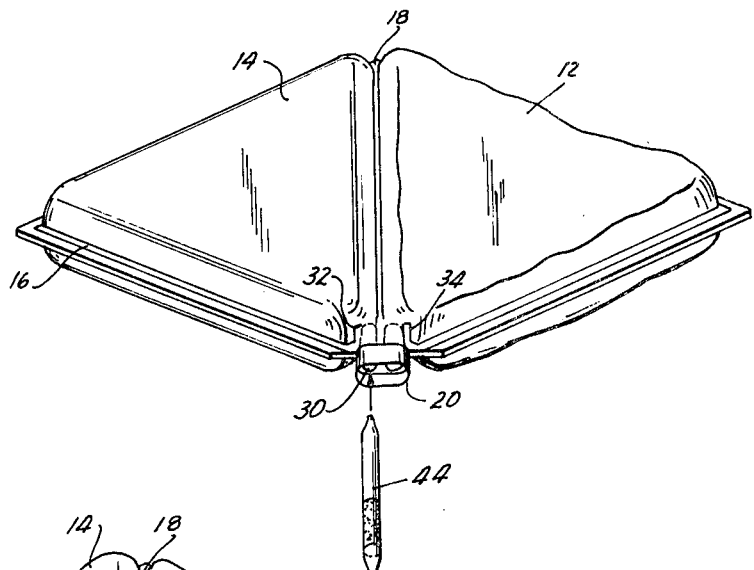
FIG. 7 is an elevational view illustrating the insertion of a testing ampoule into the inlet port of the compartment filled with alveolar air.
Figure 8:
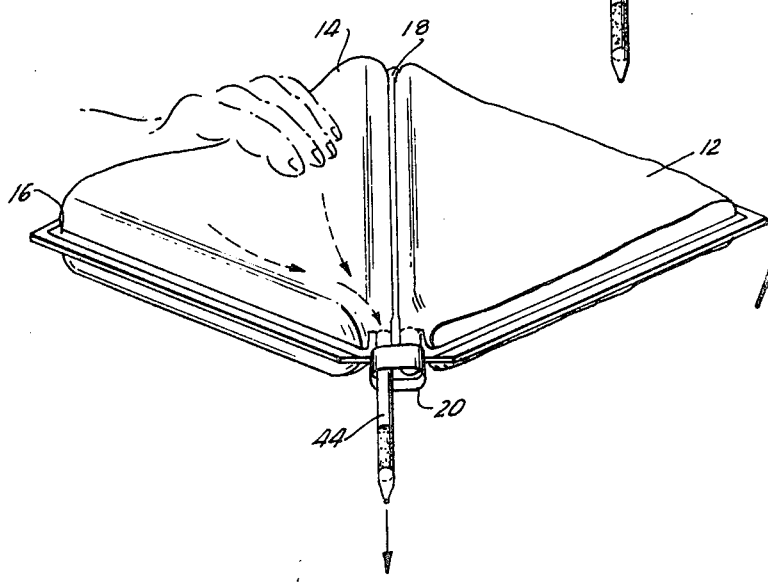
FIG. 8 is an elevational view illustrating the passage of alveolar air through the alcohol testing ampoule.

FIGS. 6–9 illustrate the filling of the testing apparatus and the analysis of the expired air for alcohol content. As shown in FIG. 6, air is exhaled into the mouthpiece and selectively fills compartment 12 initially and thereafter fills compartment 14. As illustrated in FIG. 7, after both bags are fully inflated, an analytical detection ampoule 44 is inserted into the bore of outlet conduit 30 of mouthpiece 20. As shown in FIG. 9, ampoule 44 is frictionally engaged within the bore of the outlet conduit.

Thereafter air is exhausted through the ampoule and the amount of alcohol in the air contained in the compartment is measured by the detection ampoule. Air may be discharged from compartment 14 by means of external pressure such as that supplied by a hand (shown in phantom lines in FIG. 8).

Detecton ampoule 44 is a glass tube, with sealed tips which may be broken off when the tube is employed. The ampoules contain a bed of reagent that changes color in response to contact with the gas to be determined. The reagent is held between glass wool plugs located at the opposite ends of the ampoule. When the air in compartment 14 is passed through the tube, a color change occurs length-wise of the bed. The length of the color change is dependent upon the amount of detectable gas in the sample. When alcohol is detected, the analytical detector tube can be calibrated directly in percent blood alcohol concentration, since the sample volume from the inelastic compartment is predetermined and the alcohol content of alveolar air is proportionate to the alcohol concentration in the blood. There are many conventional colorimetric indicators available for determination of alcohol. Examples of suitable indicators are disclosed in U.S. Pats. Nos. 3,223,488 and 3,455,654.

If desired, the bag may be formed wherein compartment 14 contains a colorimetric indicator in a breakable vial. The sample is collected as illustrated above and thereafter the vial is broken, while inside the compartment, to expose the indicator to the air in the compartment. The presence of varying amounts of alcohol will result in a development of color of varying shades of the indicator. The colors are compared to calibrated color standards for determining the amount of alcohol present. Conventional liquid or solid indicators may be employed.

Various modifications of the apparatus will be obvious to those skilled in the art. When mouthpiece 20 is inserted into bag 10, it may be hermetically sealed to the bag employing high radio frequency waves to seal the edges of the bag about the inlet conduits or adhesively sealed to the bag. If desired, the entire apparatus with the exception of the chemical indicator can be reemployed if properly washed and sterilized.

Having thus set forth the invention it is not to be limited except as set forth in the following claims:

We claim:

1. An apparatus for sampling alveolar breath by the sequential collection of a single exhalation comprising: an inelastic breath bag having first and second inflatable compartments and a mouthpiece connected to said bag, said mouthpiece having an entrance conduit, a first outlet in communication with said first compartment and a second outlet in communication with said second compartment, wherein said second outlet is adapted to retard the passage of air therethrough until said first compartment is inflated.

2. The apparatus in accordance with claim 1 in which said first outlet has a first exit orifice and said second outlet has a second exit orifice, wherein the internal diameter of said second exit orifice is substantially smaller than the internal diameter of said first exit orifice.

3. The apparatus in accordance with claim 1 in combination with a testing ampoule containing an alcohol sensitive reagent, said ampoule having opposite breakable ends, wherein said ampoule is adapted to be frictionally engaged at least partially within the bore of said second outlet.

4. The apparatus in accordance with claim 1 wherein said mouthpiece includes an oval band having an opening at the top and a base at the bottom, wherein first and second tubular hollow conduits extend perpendicularly from said mouthpiece base, each into one of said compartments, and wherein the internal diameter of one of the conduits at an open exit orifice is between about $3/16$ to $5/16$ inch and the internal diameter of the exit orifice of the other conduit is between about $1/32$ to $3/32$ inch.

References Cited

UNITED STATES PATENTS

| | | | |
|---|---|---|---|
| 3,437,449 | 4/1969 | Luckey | 23—254 R |
| 3,522,009 | 7/1970 | Borkenstein | 23—232 R |
| 3,544,273 | 12/1970 | McConnaughey | 23—254 R |

MORRIS O. WOLK, Primary Examiner

R. M. REESE, Assistant Examiner

U.S. Cl. X.R.

73—421.5; 128—2.07